Figure 1:
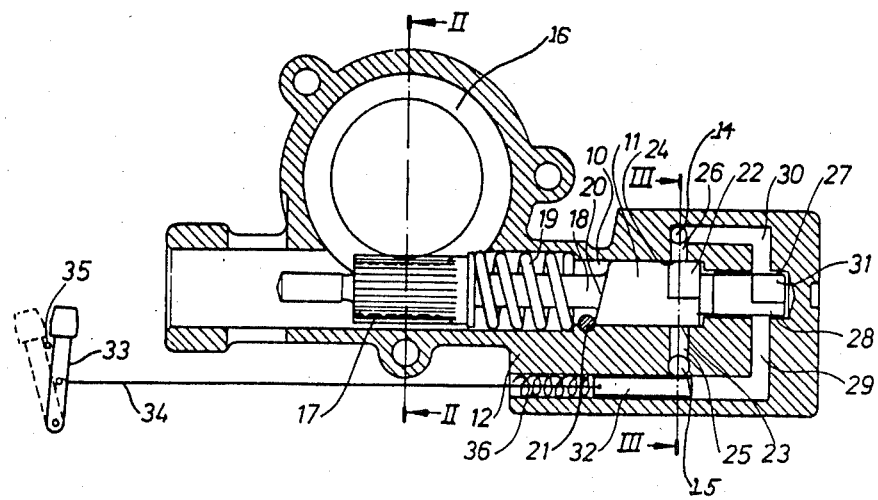

United States Patent [19]

Johansson

[11] Patent Number: 4,801,253
[45] Date of Patent: Jan. 31, 1989

[54] OIL PUMP

[75] Inventor: Jan-Erik Johansson, Huskvarna, Sweden

[73] Assignee: Aktiebolaget Electrolux, Sweden

[21] Appl. No.: 925,834

[22] Filed: Oct. 31, 1986

[30] Foreign Application Priority Data

Nov. 11, 1985 [SE] Sweden .............................. 8505321-3

[51] Int. Cl.⁴ ............................................. F04B 19/02
[52] U.S. Cl. .................................... 417/427; 417/492; 184/33
[58] Field of Search ............... 417/426, 427, 441, 486, 417/487, 500, 492, 62, 314, 515, 491, 493; 184/33, 151

[56] References Cited

U.S. PATENT DOCUMENTS

| 895,666 | 8/1908 | Nelson | 417/427 |
| 904,557 | 11/1908 | Nelson | 417/427 |
| 1,472,947 | 11/1923 | Tharp | 417/511 |
| 3,704,080 | 11/1972 | Cross | 417/486 |
| 3,763,962 | 10/1973 | Gottlieb | 184/15.2 |
| 3,776,369 | 12/1973 | Schrack | 184/15.1 |
| 3,844,380 | 10/1974 | Batson | 184/15.1 |
| 4,008,003 | 2/1977 | Pinkerton | 417/492 |
| 4,020,760 | 5/1977 | Bryer | 417/500 |
| 4,043,711 | 8/1977 | Seino | 417/500 |
| 4,094,382 | 6/1978 | Lee | 184/15.1 |
| 4,231,716 | 11/1980 | Kubota | 417/500 |
| 4,636,147 | 1/1987 | Schweitzer | 184/33 |

FOREIGN PATENT DOCUMENTS 1283042 11/1968 Fed. Rep. of Germany .
63376 4/1984 Japan .............................. 417/487

Primary Examiner—Leonard E. Smith
Attorney, Agent, or Firm—Alfred E. Miller

[57] ABSTRACT

Instead of a hand-operated oil pump for supplying extra oil to the chain of a motor saw, two pumps according to the invention are disposed on the same shaft. The first one works always, while the second one can be switched on and off. The switching is effected by choking the feed of oil partly or completely to the second one. Both the pumps are controllable by decreasing the piston stroke.

8 Claims, 1 Drawing Sheet

OIL PUMP

The present invention relates to motor saws with an i.c. engine, a saw sword affixed thereto and a saw chain driven by a spocket which is rotatably journalled on an engine shaft of the driving engine and connected to the shaft by a centrifugal clutch on the shaft, and an oil pump driven by the engine. The pump supplies oil to the saw chain which otherwise would be worn out in a short time.

It is known in the prior art to drive an oil pump directly from the engine shaft or from the spocket connected by the clutch to the engine shaft at a certain clutching r.p.m. During special duty circumstances the oil demand may be greater than the capacity of a single oil pump of the saw, and the operator must then add more oil manually. Auxiliary means has previously been introduced, such as a hand pump which gives an extra portion of oil at every pump stroke the operator performs with the pump. A separate hand-actuated oil pump must be conveniently located at the saw and have its own connections with the oil tank and the lubrication point which possibly involves great design problems and thus makes the saw more expensive. A simplification of the problem is possible by a combination of pumps as presented in the present invention.

A more simple and useful arrangement can be achieved by the present.

Figure 2:
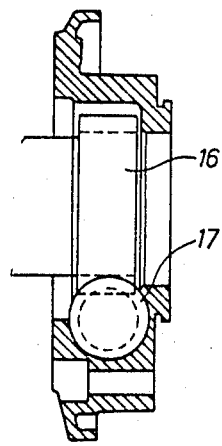
Figure 3:
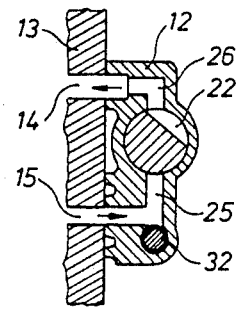

An embodiment of oil pumps according to the invention will be described in the following with reference to the accompanying drawing which shows in FIG. 1 a londitudinal cross section of the oil pump, FIG. 2 a cross section of the oil pump at the line II—II in FIG. 1 and FIG. 3 a cross section at the line III—III in FIG. 1.

An oil pump design as herein referred to has a piston 11 which is rotatably and displaceably journalled in a cylinder 10. All parts of the pump are positioned in a pump housing 12 which is assembled to a wall of a crankcase 13 of the engine. The wall of the crankcase has channels 14, 15 which extend to the lubrication point and the oil tank, respectively. The pump is, e.g., driven by a mitre gearing with a pinion and a toothed wheel 16, 17 which have teeth with a very small pitch. When the pinion 16 rotates rapidly a great gear reduction takes place so that the piston 11 with a piston rod 18 and a helical spring 19 on it rotates slowly. During the rotation an inclined surface 20 of the piston slides on an abutment 21 in the cylinder, and, by the pressure of the spring on the wheel 17, an axial movement is impacted to the piston, equal to the pitch of the inclined surface 20. The movement in one direction is effected by the spring and in the other by the inclined surface. The pump action is achieved by the said axial movement and the valve function effected by a chamfering 22 that alternately connects the cylinder to pair of ports 23, 24 in a feed line 25 and an off-line 26, respectively, in the pump housing 12. When the piston is moved as far as possible into the cylinder, as shown in FIG. 1, the chamfering is positioned upwards to the off-line 26 which is then open to the cylinder when it is and turned 180° therefrom the chamfering faces the feed line 25, when the piston is pulled back a bit within the cylinder. This type of oil pump has been known and used in motor saws for a long time.

In order to solve the problem of the invention the oil pump described in the foregoing has been completed with a cylinder 27 and a piston 28 located in the extension in the foregoing cylinder 10 as an extension of piston 11 The piston 28 is hence on the same drive member as the piston 11. The cylinder 27 is connected to the same channels 14, 15 as the foregoing cylinder by a feed line 29 and an off-line 30, respectively. The piston 28 is in conformity with the piston 11 provided with a chamfering 31 which effects the valve function in the cylinder 27 in the way as described thereinbefore.

An essential difference between the two units 10, 11 and 27, 28, respectively, is the controlled feeding of oil to the unit 27, 28. There is a valve in form of a displaceable slide 32 in the feed line 29 to keep the line wholly or partly closed in its one end position (shown) but it is possible to be set into an open position by means of a manual control 33 and a pull member 34, when the control is set into the position shown in dashed lines and locked behind a latch 35. A pressure spring 36 is disposed to reset the slide into closed position, when the control is released from the latch. The control can, of course, be actuated without locking on the latch, as the operator can only pull (or push) the same.

The unit 27, 28 has the purpose of pumping extra oil to the lubrication point at moments (which the operator decides himself) when the usual oil feeding by the unit 10, 11 is insufficient. The modes of operation of the two units are similar, the unit 27, 28 has, however, the described control arrangement 32, 33, 34 which is easily operated by the manual control.

A certain type of pump has been described herein, but the invention can be applied to nearly all types of pumps.

I claim:

1. A pump arrangement comprising a shaft mounted for rotation and axial movement in a cylinder, means for rotating said shaft, means for axially reciprocating said shaft in response to rotation thereof, said cylinder defining first and second axially spaced cylinder portions, said shaft having first and second axially spaced pistons thereon positioned within said first and second cylinder portions respectively, first and second inlet ports and first and second outlet ports coupled to said first and second cylinder portions respectively, and first and second valve means responsive to rotation of said shaft for selectively coupling said first and second cylinder portions to said first and second inlet ports and first and second outlet ports respectively, said first valve means comprising a chamfer on the first piston, whereby in one rotary position of the first piston the first cylinder portion is exposed to the first inlet port and in a second rotary position of the first piston the first cylinder is exposed to the first outlet port, said second valve means comprising a chamfer on the second piston, whereby in one rotary position of the second piston the second cylinder portion is exposed to the second inlet port and in a second rotary position of the second piston the second cylinder is exposed to the second outlet port.

2. A pump arrangement comprising a shaft mounted for rotation and axial movement in a cylinder, means for rotating said shaft, means for axially reciprocating said shaft in response to rotation thereof, said cylinder defining first and second axially spaced cylinder portions, said shaft having first and second axially spaced pistons thereon positioned within said first and second cylinder portions respectively, first and second inlet ports and first and second outlet ports coupled to said first and second cylinder portions respectively, and first and second valve means responsive to rotation of said shaft for selectively coupling said first and second cylinder portions to said first and second inlet ports and first and second outlet ports respectively, said second cylinder portion having a lesser diameter than said first cylinder portion and being immediately adjacent said first cylinder portion, the second piston having a lesser diameter than the first piston and being immediately adjacent said first piston, and the end of said second cylinder portion away from said first cylinder portion being closed, whereby a first variable volume chamber is defined between the end of said first piston toward said second piston and the end of said first cylinder portion toward said second cylinder portion, and a second variable volume chamber being defined between the end of said second piston and said closed end of said second cylinder portion.

3. A pump arrangement comprising a shaft mounted for rotation and axial movement in a cylinder, means for rotating said shaft, means for axially reciprocating said shaft in response to rotation thereof, said cylinder defining first and second axially spaced cylinder portions, said shaft having first and second axially spaced pistons thereon positioned within said first and second cylinder portions respectively, first and second inlet ports and first and second outlet ports coupled to said first and second cylinder portions respectively, and first and second valve means responsive to rotation of said shaft for selectively coupling said first and second cylinder portions to said first and second inlet ports and first and second outlet ports respectively, said outlet ports being connected together, and further comprising a manually operated valve in said first inlet port.

4. The pump arrangement of claim 3 wherein at said first valve means comprises a chamfer on the first piston, whereby in one rotary position of the first piston the first cylinder portion is exposed to the first inlet port and in a second rotary position of the first piston the first cylinder is exposed to the first outlet port.

5. The pump arrangement of claim 3 wherein said first valve means comprises a chamfer on the first piston, whereby in one rotary position of the first piston the first cylinder portion is exposed to the first inlet port and in a second rotary position of the first piston the first cylinder is exposed to the first outlet port, said second valve means comprising a chamfer on the second piston, whereby in one rotary position of the second piston the second cylinder portion is exposed to the second inlet port and in a second rotary position of the second piston the second cylinder is exposed to the second outlet port.

6. The pump arrangement of claim 3 wherein said means for axially reciprocating said shaft comprises an inclined surface on said shaft, an abutment on said cylinder, and resilient means for urging said inclined surface against said abutment.

7. The pump arrangement of claim 5 wherein said second cylinder portion has a lesser diameter than said first cylinder portion and is immediately adjacent said first cylinder portion, the second piston has a lesser diameter than the first piston and is immediately adjacent said first piston, and the end of said second cylinder portion away from said first cylinder portion is closed, whereby a first variable volume chamber is defined between the end of said first piston toward said second piston and the end of said first cylinder portion toward said second cylinder portion, and a second variable volume chamber is defined between the end of said second piston and said closed end of said second cylinder portion.

8. The pump arrangement of claim 2 wherein said first and second valve means comprise chamfers on said first and second pistons.

* * * * *